March 7, 1939.   J. M. NICKELSEN   2,149,621
CONNECTOR
Filed Nov. 4, 1935
FIG.1.
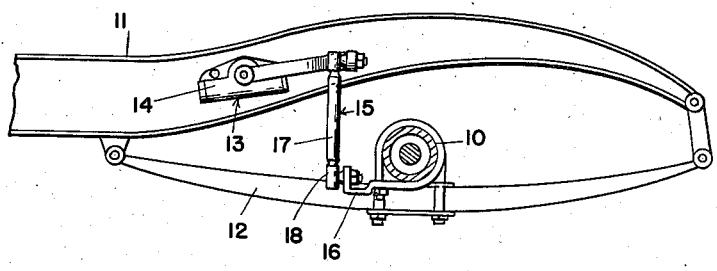
FIG.2.
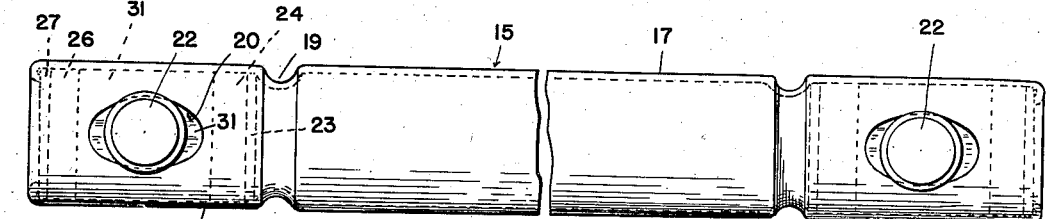
FIG.3.
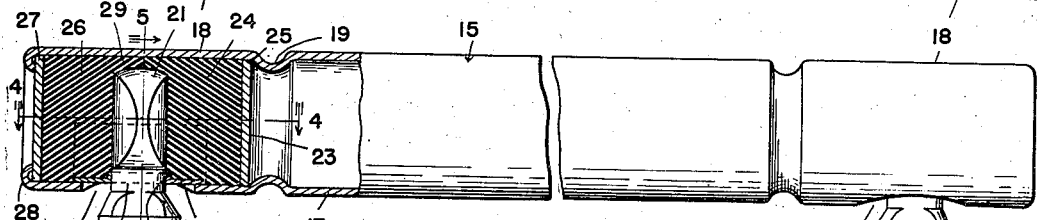
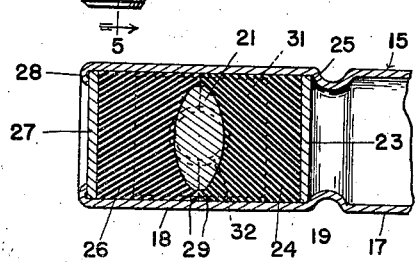
FIG.4.
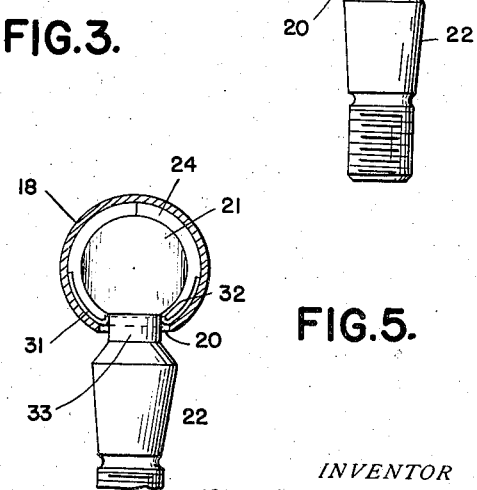
FIG.5.
INVENTOR
JOHN. M. NICKELSEN
BY
ATTORNEYS Patented Mar. 7, 1939

2,149,621

UNITED STATES PATENT OFFICE 2,149,621

CONNECTOR

John M. Nickelsen, Ann Arbor, Mich., assignor to Monroe Auto Equipment Company, Monroe, Mich., a corporation of Michigan Application November 4, 1935, Serial No. 48,223

2 Claims. (Cl. 287—85)

This invention relates generally to connecting links and refers more particularly to link assemblies for operatively connecting an unsprung part of a vehicle to a sprung part of the same.

One of the principal objects of this invention consists in the provision of a relatively simple and durable link assembly capable of being inexpensively manufactured, assembled and installed.

Another advantageous feature of the present invention resides in the provision of a link assembly embodying a fastener element adjacent one end thereof having a portion firmly imbedded in rubber, carried by the link body, in such a manner as to not only permit the universal movement of the fastener element relative to the link body required to compensate for angular movements of the link body, but to also substantially insulate the fastener element from metallic contact with the link body, and thereby eliminate any tendency for the parts of the link assembly to rattle or squeak during operation.

A further object of the present invention consists in the provision of a link assembly of the character set forth in the preceding paragraph wherein the connecting element, although imbedded in rubber, is fixedly held in assembled relation with the link body and is capable of withstanding abnormal operation without working loose or creating any objectionable noise.

The foregoing, as well as other objects, will be made more apparent as this description proceeds, especially when considered in connection with the accompanying drawing, wherein Figure 1 illustrates my improved link construction installed on a motor vehicle chassis;

Figure 2 is an enlarged side elevational view of the link body;

Figure 3 is an enlarged view partly in section of the link assembly featured in Figure 1;

Figure 4 is a fragmentary sectional view taken substantially on the plane indicated by the line 4—4 of Figure 2; and Figure 5 is a sectional view taken on the line 5—5 of Figure 3.

For the purpose of illustration, I have shown my improved link assembly as installed upon a vehicle chassis for connecting the usual shock absorber arm, carried by the sprung unit of the chassis, to the axle forming a part of the unsprung unit of the chassis, because this installation requires silent high frequency operation of the link assembly and the advantages of the construction about to be described are particularly suited for this purpose. It will, of course, be understood that my improved link construction may be incorporated in numerous different types of installations and the particular one selected herein for the purpose of illustration should not be considered as limiting the spirit and scope of the invention.

Referring now to the drawing, it will be noted that there is illustrated in Figure 1, a portion of a vehicle chassis having an axle unit 10 and having a frame assembly 11 supported from the axle unit by means of suitable suspension springs 12. In accordance with conventional practice, deflection of the suspension springs is stabilized or controlled by means of a shock absorber 13 having the usual mechanism 14 secured to the frame and having a link assembly 15 operatively connecting the arm 16 of the mechanism to the axle.

The link assembly 15 shown particularly in Figure 3, comprises a tubular body 17 having tubular end sections 18 and fastener elements 22 secured within the end sections 18. In detail, the tubular end sections 18 of the body 17 are formed with elliptical openings 20 through one side thereof having the major axes extending in the direction of the axis of the body 17, and having a length predetermined to provide for extending the enlarged circular heads 21 of the fastener elements 22 therethrough. Upon reference to Figure 3, it will be noted that the heads 21 are rotated through 90 degrees after the same have been inserted through the openings 20 and the minor axes of the latter openings are less than the diameter of the heads 21, so as to prevent disengagement of the heads from the tubular sections 18 of the link. In other words, when the fastener elements 22 are in their operative positions with respect to the body 17 of the link, the opposite sides of the heads 21 extend transversely to the axis of the body portion 17.

Prior to inserting the head portions 21 of the fastener elements 22 through the elliptical openings 20 into the tubular sections 18, the discs 23 and the rubber blocks 24 are inserted into the tubular sections from the extremities of the latter. In detail, the discs 23 are assembled in the tubular sections 18 before the blocks 24, and are adapted to seat against annular shoulders 25 formed by reducing the body 17 adjacent the ends thereof, as indicated by the character 19. After the discs 23 have been positioned in the tubular sections 18, the rubber blocks 24 are inserted in the tubular 18, the rubber blocks 24 are inserted in the tubular sections and are positioned against the discs 23 in the manner clearly shown in Figure 3. The enlarged heads of the fastener elements 22 are then inserted through the elliptical openings 20 and rotated through approximately 90 degrees to the position thereof also shown in Figure 3. In this connection, it may be pointed out that although the rubber blocks 24 extend into the elliptical openings 20 to a certain extent, nevertheless, the same are sufficiently compressible to permit forcing the head portions 21 of the fastener elements 22 into the tubular end sections 18.

After the fastener elements 22 have been properly positioned with respect to the tubular body portion 17, the rubber blocks 26 are inserted into the tubular sections 18 for engagement with the outer sides of the heads 21. The blocks 26 are complementary to the blocks 24 and co-operate with the latter in holding the heads 21 of the fastener elements in position in the tubular sections 18.

The rubber blocks are held under compression within the tubular end sections 18 of the body 17, by means of discs 27 inserted into the extremities of the tubular end sections 18 for engagement with the outer sides of the blocks 26 and permanently secured in place by crimping the extremities 28 of the end sections 18 over the discs, in the manner clearly shown in Figure 3.

In order to insure against metallic contact of the heads 21 of the fastener elements with the tubular body portion 17 of the link, the rubber blocks are molded to provide lips 29 adapted to extend around the circular heads 21 between the latter and adjacent walls of the tubular end sections 18. In other words, the lips 29 of the co-operating blocks form in effect pockets for receiving the heads 21 of the fastener elements 22. The above construction not only serves to insulate the heads 21 from the metallic contact with the tubular body of the link assembly, but also assists in firmly clamping the fastener elements to the tubular body.

In order to prevent displacement of portions of the rubber blocks through the elongated openings 20, I provided suitable closures for these openings. As shown in Figure 5, the closure for each opening 20 comprises a pair of complementary semi-circular strips 31, having recesses 32 in adjacent edges co-operating with each other to form an opening of the dimension required to receive the reduced portions 33 of the fastener elements 22. Thus, it will be observed that the strips 31 co-operate with the neck portions 33 of the fastener elements to completely close the elongated openings 20. The strips 31 of the closures are held in assembled relation within the tubular sections 18 by the rubber blocks, and are assembled in the tubular end sections 18 in the following manner. The inner strips of the closures are inserted into the tubular end sections 18 just prior to assembling the fastener elements 22 with the tubular end sections 18, and the outer sections are inserted into the latter prior to locating the rubber blocks 26 in position. It may be pointed out that the sections 31 of the closures for the openings 20 are preferably formed of a highly ductile metal such as copper, so that the contact of the same with the fastener elements 22 will not create objectionable noise during the operation, and so that the inner sections 31 of the closures may be displaced with the inner rubber blocks 24 upon inserting the enlarged heads 21 into the end sections 18 through the openings 20.

The ends of the fastener elements 22 opposite the heads 21 may be threaded for attachment to the sprung and unsprung parts of the vehicle. Any particular method may be employed for securing the fastener elements to the desired parts of the vehicle, and the means shown herein for accomplishing this result should not be considered as limiting this invention.

Thus, from the foregoing, it will be observed that I have provided a relatively simple, inexpensive link assembly possessing a high degree of durability and capable of being readily installed. It will further be noted that while the fastener elements of the link assembly are imbedded in rubber in such a manner as to insure noiseless operation, nevertheless, these fastener elements are firmly held in assembled relation.

What I claim as my invention is:

1. A connecting link assembly comprising a body section having a tubular portion, a fastener element having a head portion extending through an opening in one side wall of the tubular portion, a resilient non-metallic material secured within the tubular portion against opposite sides of the head under sufficient compression to frictionally engage said head whereby relative movement of the fastener element and tubular portion is permitted by interparticle flow of the resilient material, and means housed within the tubular portion and co-operating with the fastener element to close the opening aforesaid through the side wall of the tubular portion.

2. A connecting link assembly comprising a body section having a hollow portion, a fastener element having a head portion extending through an opening in one side wall of the hollow portion, a resilient non-metallic material secured within the hollow portion against opposite sides of the head portion of the fastener element under sufficient compression to frictionally engage the head portion whereby relative movement of the fastener element and body section is permitted by interparticle flow of the resilient material, and means cooperating with the fastener element to close the opening including strips of ductile metal housed within the hollow portion between the resilient material and inner surfaces of the hollow portion.

JOHN M. NICKELSEN.